March 6, 1934.                L. G. JAMES ET AL                1,949,835
                        METHOD OF MANUFACTURING CANDY
                            Filed Dec. 13, 1932

Inventors
Lee G. James,
Harry E. James,
Enoch R. James,

By Cushman, Byatt, Darby & Cushman
                              Attorneys

Patented Mar. 6, 1934

1,949,835

UNITED STATES PATENT OFFICE 1,949,835

METHOD OF MANUFACTURING CANDY

Lee G. James, Harry E. James, and Enoch R. James, Atlantic City, N. J., assignors to James', Inc., Atlantic City, N. J., a corporation of New Jersey Application December 13, 1932, Serial No. 647,058

4 Claims. (Cl. 107—54)

The present invention relates to a new and improved method of making confections and more particularly, taffy-like candy having a coating of suitable edible material such as chocolate or the like, and is a continuation in part of our Patent No. 1,893,673, dated January 10, 1933.

An essential feature of the invention consists in a new and improved method of manufacturing taffy-like candy in which a bark or skin is formed on a candy mass, as by applying pulverulent material to the batch or mass and then cutting the taffy into individual pieces while drawing the bark over the cut faces or sides so as to seal or cover the same.

A further object consists in an improved method of cutting taffy-like candy into individual pieces so that the skin or bark formed by the pulverulent material will be drawn or pinched over the severed or exposed sides of the individual pieces.

Other objects and advantages of the invention will become apparent from the following description when taken in conjunction with the accompanying claims and drawing.

Referring to the drawing.

Figure 1:
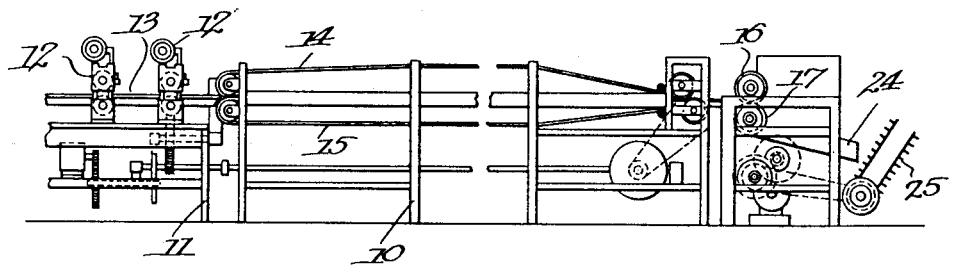
Figure 1 is a side elevation of a machine for forming the taffy-like candy in accordance with the invention.
Figure 2:
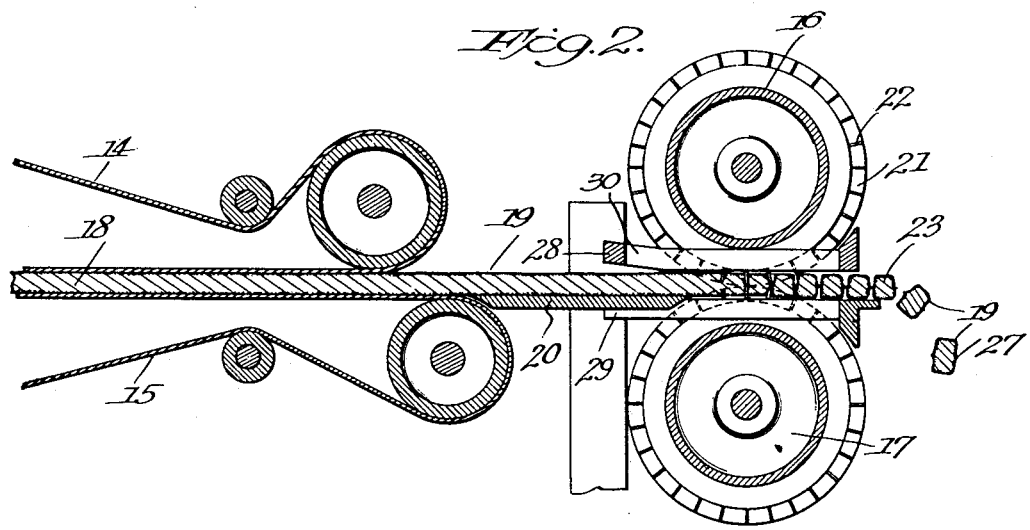
Figure 2 is an enlarged sectional view of the cutting end of the machine shown in Figure 1.

Referring to the drawing in which like numerals indicate like parts in the several views, 10 designates a machine which may be used in making the taffy-like candy in accordance with our improved method. The machine 10 preferably comprises a supporting frame 11 on which is mounted a plurality of pairs of compressing and reducing rolls 12 between which are arranged horizontal supports 13. The batch of taffy-like candy which initially is thick and bulky is reduced to elongated sheet-like form of the desired thickness by the rolls 12. After passing from the last pair of rolls, the sheet-like body of taffy is received between the endless bands 14 and 15 which are of such a length as to allow the taffy to set so that subsequent shrinkage and distortion of pieces cut therefrom by the cutters 16 and 17 will be avoided.

Figure 4:
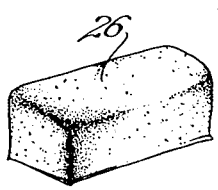
Figure 4 is a perspective view of a piece of candy after being cut and provided with a coating of edible material.

As the reduced batch of taffy 18 passes over the supports 13, suitable pulverulent vegetable material such as cornstarch, is sprinkled or otherwise applied to form a skin or bark 19 upon the taffy mass to prevent shrinkage thereof. The sheet 18 as it issues from the ends of the bands 14 and 15 is conducted by the platform or base 20 to the revoluble cutters 16 and 17, each of which may be formed with annular or circumferentially disposed blades 21 and transverse or axially extending blades 22 so as to form substantially rectilinear shaped pockets into which the individual pieces 23 cut from the batch 18 are received during the cutting operation. The pieces 23 are discharged from the cutter and delivered by a chute 24 to a suitable tumbling means and then coated with edible material 26 (Figure 4) such as chocolate or the like.

Figure 3:
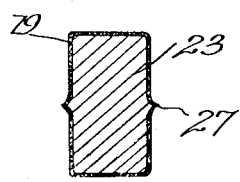
Figure 3 is a sectional view of a piece of taffy-like candy formed in accordance with our method.

As the taffy-like mass 18 and skin 19 pass between the revoluble cutters 16 and 17, the skin 19 is drawn over the cut or severed faces by the cutters and united as at 27 (Figure 3) so as to seal or envelop the severed portions of each individual piece of taffy 23.

The cut pieces of candy are prevented from adhering to the walls of the cutter pockets by the stationary stripper frames 28 and 29 which have spaced transverse rods or arms 30 extending through complementary slots formed in the cutters 16 and 17. It will be seen that when the cutters are in operation the individual pieces 23 will be dislodged and ejected from the pockets due to the pressure exerted in opposite directions by the arms 30 on the top and bottom faces of each individual piece of taffy.

While we have shown revoluble cutters for severing the taffy-like mass into individual pieces, obviously, the taffy may be cut by various other means such as a reciprocating cutter or the like so that the skin during the cutting operation will be drawn over the exposed sides or faces to close the same.

In our improved method of forming the cut pieces from a candy sheet or strip, the taffy is first reduced to the desired size and thickness and then the pulverulent material is preferably applied so as to close or fill the pores. As the candy sheet is fed to the cutter, it is allowed to cool so that a skin or bark is formed on its outer surface, which skin, during the cutting operation, is drawn or pulled over the cut ends of the pieces to seal the same and prevent the escape or leaking of the soft taffy at these points.

It is to be understood that the method shown and described is merely illustrative of a preferred embodiment and may be changed without departing from the spirit of the invention and the scope of the appended claims.

We claim:—

1. The improved method of manufacturing taffy-like candy which consists in forming a skin or bark upon a taffy mass by applying a pulverulent material to the taffy mass and thereafter cutting the mass into individual pieces while drawing the bark over the cut faces thereof.

2. The improved method of manufacturing taffy-like candy which consists in forming a skin or bark upon a taffy mass by applying a pulverulent material to the taffy mass and permitting the mass to receive a set, and thereafter cutting the mass into individual pieces while drawing the bark over the cut faces thereof.

3. The improved method of producing taffy-like candy which consists in forming a skin or bark upon a sheet-like taffy mass by applying a pulverulent material to the mass, and thereafter cutting the mass into individual pieces while drawing the bark over the cut faces of the individual pieces.

4. The improved method of producing taffy-like candy which consists in forming a skin or bark upon a sheet-like taffy mass by applying a pulverulent material to the mass and permitting the mass to receive a set, and thereafter cutting the mass into individual pieces while drawing the bark over the cut faces of the individual pieces.

LEE G. JAMES.
H. E. JAMES.
ENOCH R. JAMES.